(12) United States Patent
Gosalia

(10) Patent No.: US 11,308,480 B2
(45) Date of Patent: Apr. 19, 2022

(54) ANONYMIZING USER IDENTITY VIA MACHINE-READABLE CODES

(71) Applicant: PayPal, Inc., San Jose, CA (US)

(72) Inventor: Jigar Rajnikant Gosalia, Fremont, CA (US)

(73) Assignee: PAYPAL, INC., San Jose, CA (US)

(*) Notice: Subject to any disclaimer, the term of this patent is extended or adjusted under 35 U.S.C. 154(b) by 222 days.

(21) Appl. No.: 15/852,212

(22) Filed: Dec. 22, 2017

(65) Prior Publication Data

US 2019/0197516 A1     Jun. 27, 2019

(51) Int. Cl.
    *G06Q 20/32*       (2012.01)
    *G06K 19/06*       (2006.01)
    *G06Q 20/38*       (2012.01)
    *G06Q 50/00*       (2012.01)
    *G06K 7/14*         (2006.01)

(52) U.S. Cl.
CPC ....... *G06Q 20/3276* (2013.01); *G06K 7/1417* (2013.01); *G06K 19/06037* (2013.01); *G06Q 20/383* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2002/0113127 A1* | 8/2002 | Takeuchi | ............. | G06K 7/0004 235/462.25 |
| 2004/0199402 A1* | 10/2004 | Walker | ................... | G06Q 30/02 705/313 |
| 2004/0225573 A1* | 11/2004 | Ling | ..................... | G06Q 30/06 705/26.1 |
| 2006/0071077 A1* | 4/2006 | Suomela | .............. | G06K 7/1095 235/462.01 |
| 2007/0228171 A1* | 10/2007 | Thiyagarajah | ........... | G06K 7/14 235/462.09 |
| 2011/0137797 A1* | 6/2011 | Stals | ..................... | G06Q 20/02 705/44 |
| 2012/0158589 A1* | 6/2012 | Katzin | ................. | G06Q 20/384 705/44 |
| 2013/0041831 A1* | 2/2013 | Das | ........................ | G06Q 20/20 705/72 |
| 2013/0066783 A1* | 3/2013 | Wolff | .................. | G06Q 20/223 705/44 |
| 2013/0198019 A1* | 8/2013 | Smith | .............. | G06K 19/06112 705/17 |

(Continued)

*Primary Examiner* — William J Jacob

(74) *Attorney, Agent, or Firm* — Haynes and Boone, LLP

(57) ABSTRACT

A machine-readable code is generated in response to a request from a first user. The request specifies a number of times or a time period during which the machine-readable code can be validly scanned electronically. The machine-readable code is displayed on a device of the first user. The machine-readable code is electronically scanned by a device of a second user. A determination is made as to whether a scan of the machine-readable code by the device of the second user occurred within the specified number of times or within the specified time period. An electronic interaction between the first user and the second user is performed response to the determination, while an identity of the first user or an identity of the second user is concealed from each other and from social media contacts of the first user and the second user.

20 Claims, 14 Drawing Sheets

(56) References Cited

U.S. PATENT DOCUMENTS

| | | | | |
|---|---|---|---|---|
| 2013/0215475 | A1* | 8/2013 | Noguchi | H04N 1/32106 |
| | | | | 358/448 |
| 2013/0238503 | A1* | 9/2013 | Patel | G06Q 20/385 |
| | | | | 705/44 |
| 2013/0278622 | A1* | 10/2013 | Sun | G06Q 20/22 |
| | | | | 345/589 |
| 2014/0263623 | A1* | 9/2014 | Robison | G06K 7/1447 |
| | | | | 235/380 |
| 2015/0120568 | A1* | 4/2015 | Hagemann | G06Q 20/3276 |
| | | | | 705/64 |
| 2016/0191318 | A1* | 6/2016 | Neilson | H04L 41/0869 |
| | | | | 709/220 |

* cited by examiner

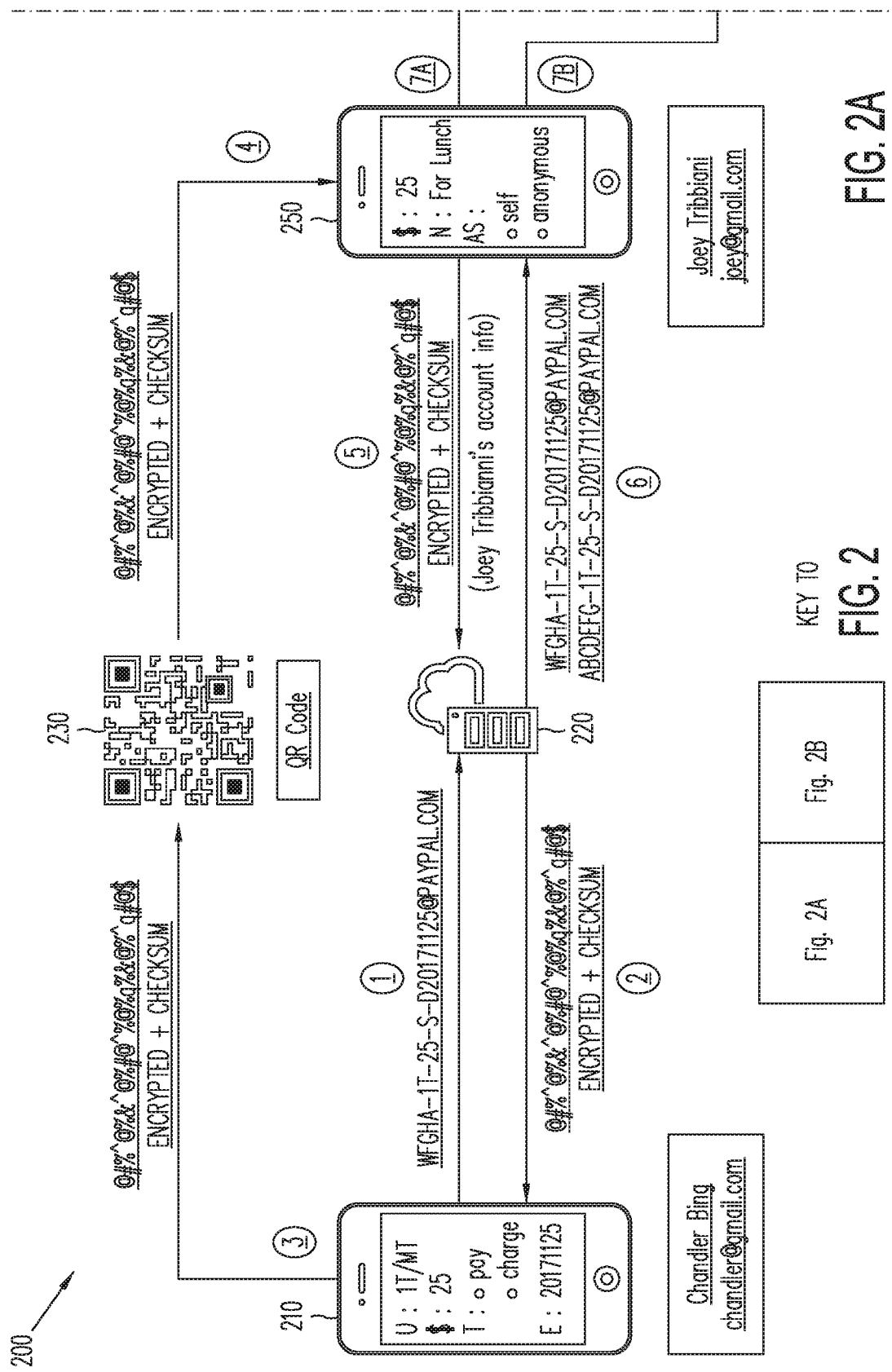

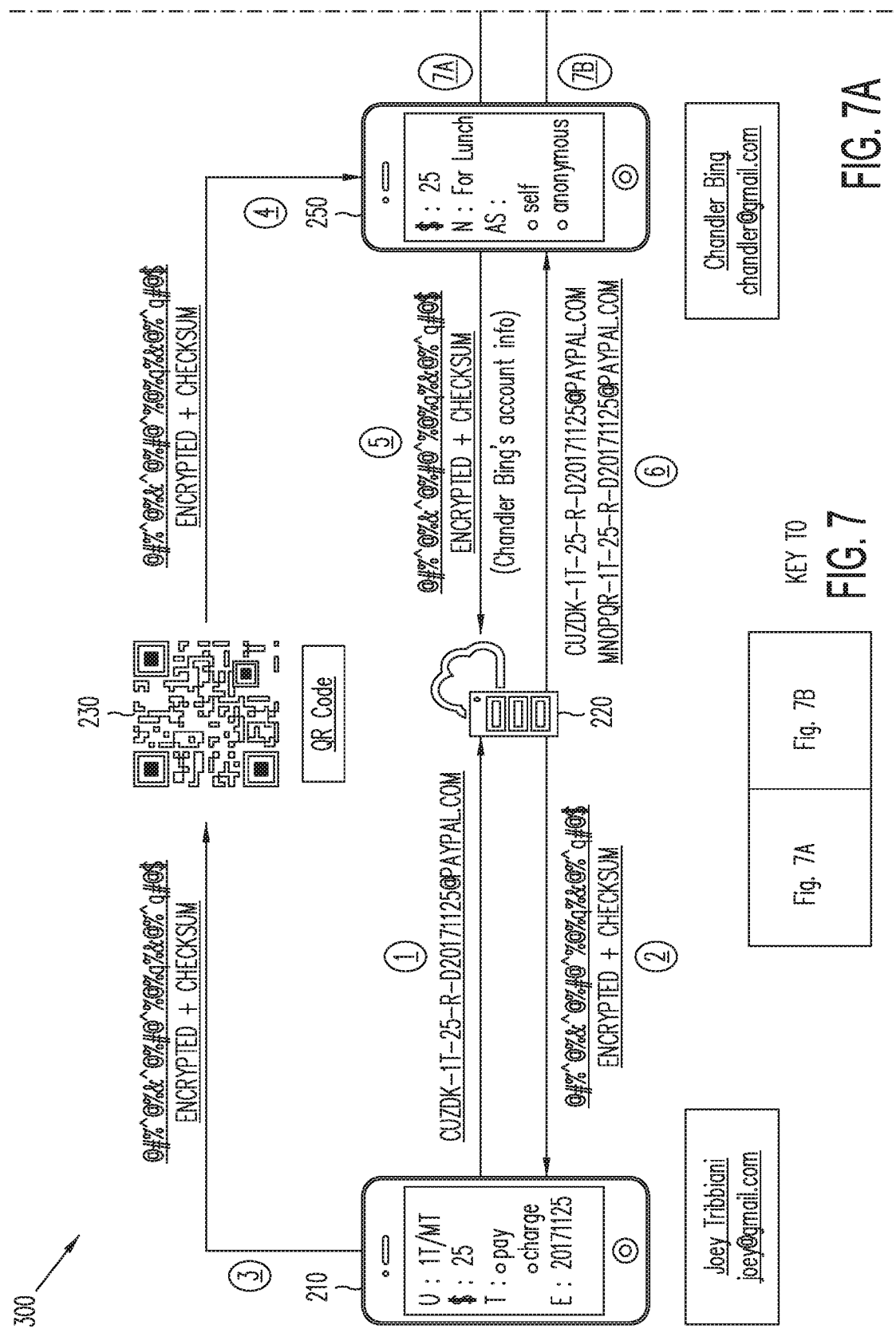

FIG. 8A

FriendlyQRCode

Amount  25

Note  for travel

User As  ⊙ self  ○ anonymous  Chandler Bing

SEND MONEY

FIG. 8B

FriendlyQRCode

Amount  30

Note  for travel

User As  ○ self  ⊙ anonymous  Venmo User

SEND MONEY

ANONYMIZING USER IDENTITY VIA MACHINE-READABLE CODES

BACKGROUND

Field of the Invention

The present invention generally relates to machine-readable codes and more particularly to the use of machine-readable codes for data security.

Related Art

Over the past several decades, rapid advances in Integrated Circuit fabrication and wired/wireless telecommunications technologies have brought about the arrival of the information age, in which electronic communications or interactions between people are becoming increasingly more common. One downside, however, is that it may be more challenging to protect or conceal data contained in such electronic communications or interactions, such as the identity of the parties involved. The recent popularization of social media has exacerbated this problem, since activities of users may be unwillingly or unknowingly exposed to the public, for example through social media postings made by other users who may have also been engaged in the same activities. As such, privacy protection has become an important concern. Unfortunately, existing methods and systems have not offered effective user-friendly privacy-protection tools. It would be advantageous to offers tools that allow users to protect anonymity by easily hiding their identity.

BRIEF DESCRIPTION OF THE FIGURES

FIG. 2 illustrates a process flow of conducting a transaction in which user anonymity is protected according to various aspects of the present disclosure.

FIGS. 3-4, 5A-5B, and 6A-6B illustrate user interfaces of an application for protecting user anonymity according to various aspects of the present disclosure.

FIGS. 8A-8B and 9A-9B illustrate user interfaces of an application for protecting user anonymity according to various aspects of the present disclosure.

Figure 1:
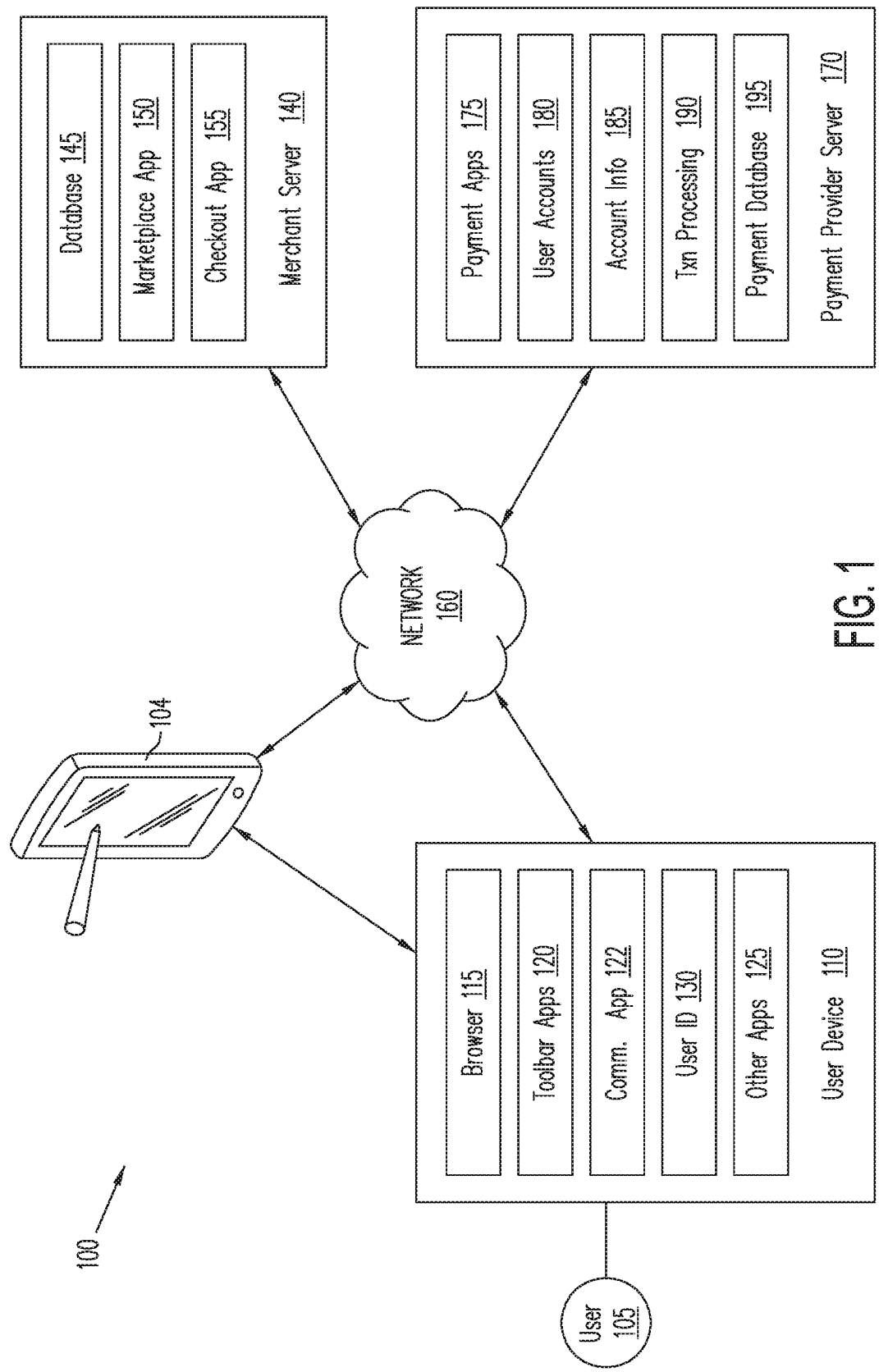
FIG. 1 is a block diagram of a networked system according to a various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

As people engage in more activities and conduct more transactions online, user privacy has become an increasingly important concern. Due to the nature of electronic online transactions, it is difficult for users to not leave any traces of their identity (e.g., name, address, phone number, email, etc.) behind. The growing popularity of social media has further compounded the problem, since social media provides an easily-accessible platform for other users to reveal transaction details and the identity of the user who was involved in the transaction. This may be undesirable for many users, who may wish to keep their identity hidden, to prevent unauthorized or fraudulent use of their identity data, such as for account takeovers or creation of unauthorized accounts.

For example, a first user may have a meal with a second user whom the first user just met, and they may be splitting the bill for the meal using an electronic payment application such as VENMO™. However, the first user is not sure that he will see the second user again, or vice versa. Therefore, rather than risk divulging their true identities, the first user and/or the second user may wish to maintain their anonymity while using the electronic payment application. As another example, a user may attend an event (e.g., charities, thrift stores, fundraisers, etc.) that may involve conducting electronic transactions, but the user may not want to publicize the fact that he attended the event. As yet another example, the user may want to pay for a service but does not want to receive follow-up advertisements from the service provider.

To address the privacy concerns of users, the present disclosure offers an application that allows the users to engage in activities electronically or online, while hiding their identities from the other users involved in the activity and from the general public, for example from the social media contacts of any of the users. In one embodiment, a first user may specify the parameters regarding a use of a machine-readable code, such as a QR code. A server or a mobile device of the first user may then generate and send the machine-readable code based on the specified parameters. The specified parameters and the account information of the first user may be encrypted and embedded into the machine-readable code. The machine-readable code may be displayed on the mobile device of the first user or via another printed or electronic medium, such as on paper or via a computer/phone screen. A mobile device of a second user scans the machine-readable code and sends the scanned information to the server. The server determines whether the condition (e.g., number of times the machine-readable code was scanned, the time period in which it was scanned, etc.) under which the scan was performed satisfies the parameters specified by the first user. If so, a transaction is processed (e.g., by the server) between the first user and the second user. In this process, the first and second users may remain anonymous to one another and/or to the general public, for example to the social media contacts of either the first user or the second user. Advantageously, this helps protect user identity and data security. Various aspects of the present disclosure are discussed below in more detail.

FIG. 1 is a block diagram of a networked system 100 according to embodiments of the present disclosure. Networked system 100 may comprise or implement a plurality of servers and/or software components that operate to perform various transactions or processes, such as transactions or processes involving multiple parties, for example a payment transaction. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include one or more user devices such as the user device 104, the user device 110, a merchant server 140, and a payment provider server 170 in communication over a network 160. Payment provider server 170 may be maintained by a payment service provider, such as PayPal, Inc. of San Jose, Calif. A user 105, such as a sender or consumer, utilizes user device 110 to perform a transaction using payment provider server 170. User 105 may utilize user device 110 to initiate a payment transaction, receive a transaction approval request, or reply to the request. Note that transaction, as used herein, refers to any suitable action performed using the user device, including payments, transfer of information, display of information, etc. For example, user 105 may utilize user device 110 to initiate a deposit into a savings account. Although only one merchant server is shown, a plurality of merchant servers may be utilized if the user is purchasing products or services from multiple merchants.

In some embodiments, user device 110 may download a mobile application from payment provider server 170, from merchant server 140, or from another third party. The mobile application may allow user 105 to engage in transactions with other users, for example with a user of the device 104. In some embodiments, the mobile application is capable of generating, displaying, or scanning a machine-readable code, such as a barcode or a quick response (QR) code.

User devices 104/110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

The user devices 104 and 110 may have different hardware and or software from one another in some embodiments, or the same (or substantially similar) hardware and software in other embodiments. For the sake of simplicity, the user device 110 is discussed below in more detail as a representative example of the user devices of the system 100. User device 110 may be implemented using any appropriate hardware and software configured for wired and/or wireless communication over network 160. For example, in one embodiment, user device 110 may be implemented as a personal computer (PC), a smart phone, laptop computer, a wearable computing device, and/or other types of computing devices capable of transmitting and/or receiving data, such as an iPad™ from Apple™.

User device 110 may include a wireless transceiver, such as a Bluetooth transceiver or an NFC transceiver, or a radio frequency (RF) transceiver, to facilitate the electronic communication conducted with external devices. For example, user device 110 may communicate with other mobile devices, such as with the device 104, via Bluetooth Low Energy (BLE) communication or via NFC.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise utilize a smart wallet through the payment provider as discussed above. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

In some embodiments of the present disclosure, the mobile application associated with the machine-readable code may be implemented as, or integrated within, the toolbar applications 120, the communication applications 122, or the other applications 125.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes service providers as well as banks and retailers. Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

Figure 2B:
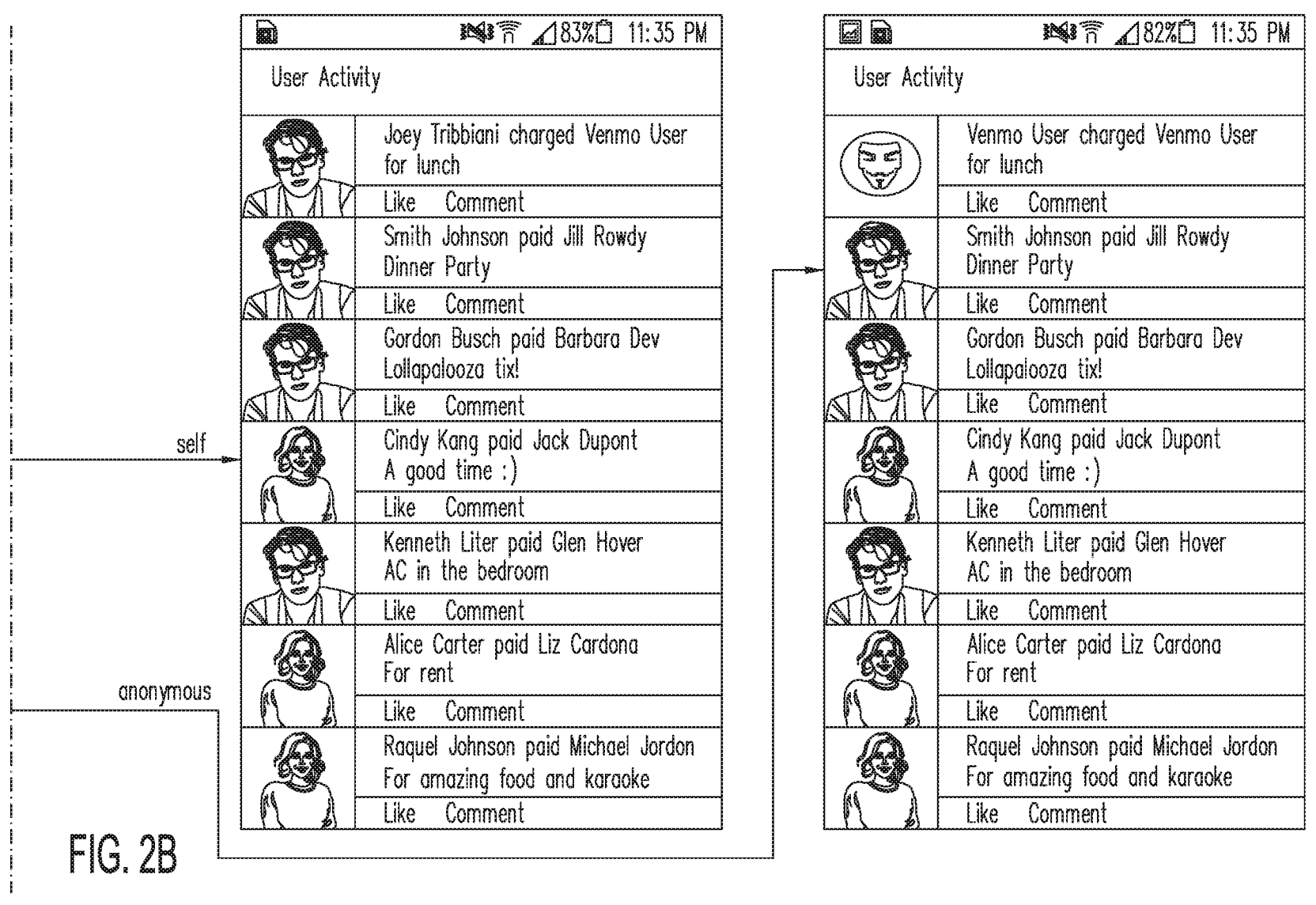

FIG. 2 illustrates a process flow 200 according to an embodiment of the present disclosure. The process flow 200 shows an example context in which a machine-readable code can be generated and used to protect user identity and/or provide user anonymity. In step 1 of the process flow 200, a user—Chandler Bing—launches a mobile application on his mobile device 210. The mobile device 210 may be an embodiment of the user device 110 discussed above, and the mobile application may be implemented as the mobile application installed on the user device 110. The various user interfaces of the mobile application are illustrated in FIGS. 3, 4, 5A-5B, 6A-6B, 8A-8B, and 9A-9B.

Figure 3:
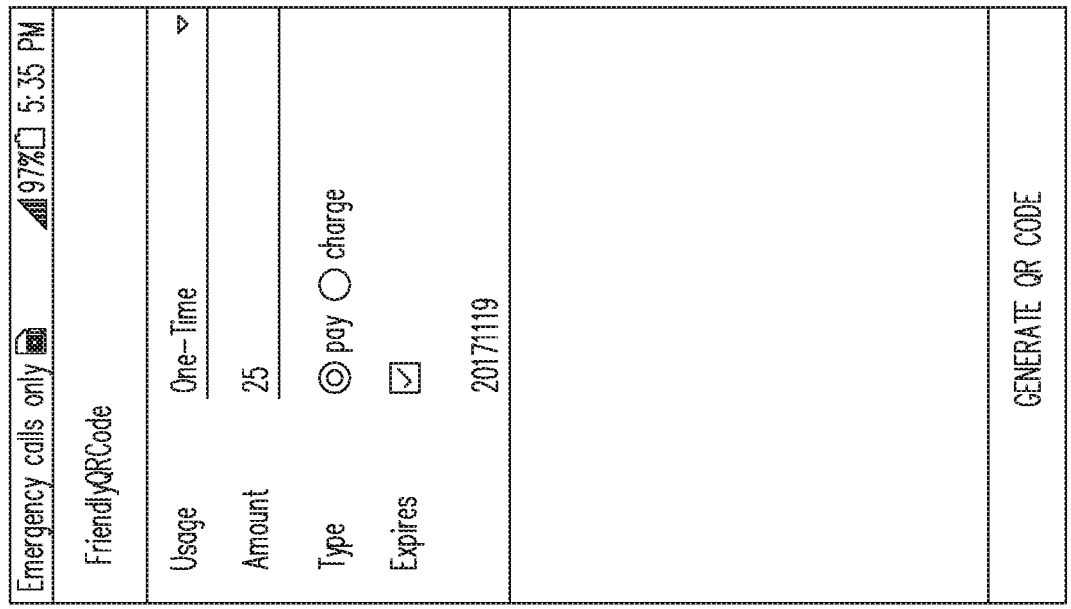

Referring to FIG. 3, the user interface of the mobile application allows the user (e.g., Chandler Bing) to specify a plurality of parameters of the machine-readable code associated with a transaction. These parameters specify the condition under which the machine-readable code may be validly scanned. In other words, if the electronic scan of the machine-readable code occurs outside of the user-specified parameters, the scan (or the machine-readable code) may be deemed invalid, and the transaction associated with the machine-readable code may be suspended or halted, at least temporarily.

One example parameter is the usage type, for example, whether the machine-readable code should be a one-time use code, or whether it may be used multiple times. The usage type parameter may be selected via a drop menu shown in FIG. 3, as a non-limiting example. Another example parameter is the type of transaction, for example whether the transaction is a "pay" type (where the user pays another party) or whether the transaction is a "charge" type (where the user charges another party for payment). A further example parameter is the amount of the transaction (e.g., 25 dollars as shown in FIG. 3). The user may type in the amount via a virtual keyboard, or he may enter the amount (or other information) via voice commands/dictation, or by pointing to an image which has numbers, where the number pointed may be identified as the amount through image processing. In some embodiments, the amount of the transaction may specify an upper limit or a lower limit of the transaction. For example, if the user is charging another party for payment, the user may specify that the minimum or lower limit of the charged amount is 25 dollars. The other party is free to pay more than 25 dollars if he/she so wishes, but no less than the specified lower limit of 25 dollars. Yet another example parameter is the expiration date of the machine-readable code. As shown in FIG. 3, the user may manually type in the expiration date (e.g., 20171119, representing year 2017, November 19), or the user may select the expiration date via a virtual calendar, etc. The expiration date specifies a time period within which the machine-readable code is valid. For example, the machine-readable code may only be valid until the specified expiration date is reached, and it is no longer valid after the expiration date. In some embodiments, the user may also set a beginning date and an end date for a time period within which the machine-readable code is valid. After specifying the parameters, the user may request the machine-readable code to be generated by clicking on the virtual button "GENERATE QR CODE".

It is understood that although it is not specifically shown in FIG. 3, the user Chandler Bing may also use the interface shown in FIG. 3 or a similar interface to specify that he wishes to conceal his real identity (e.g., name, contact information, address, etc.) in the transaction.

Referring back to FIG. 2, in response to the clicking of the button "GENERATE QR CODE", the user device 210 sends the parameters associated with the machine-readable code (yet to be generated) to a server 220, along with the account information of the user (e.g., account information of Chandler Bing in this case). The server 220 may be implemented as an embodiment of the server 170 discussed above in association with FIG. 1.

The information sent to the server 220 may be visually represented in FIG. 2 as a string "WFGHA-1T-25-S-D20171125@PAYPAL.COM," where "WFGHA" represents the account information (e.g., real name of the user, a handle of the user, phone number of the user, email of the user, etc.), "1T" represents that the machine-readable code may be used only 1 time, "25" represents the monetary amount associated with the machine-readable code, "S" represents that the transaction is a "send" type transaction in which the user sends funds to another party (e.g., paying the other party), "D20171125" represents the expiration date (e.g., November 25 of year 2017) of the machine-readable code, and "PAYPAL.COM" represents the domain name of the server 220. It is understood that this string is merely a visual illustration of the information sent to the server 220 in the context of the graphical process flow 200 shown in FIG. 2, and that the actual information sent to the server 220 may have more, less, or different parameters and may not be in the form of the string.

In step 2 of the process flow 200, the server 220 generates a machine-readable code based on the information sent by the user device 210. The machine-readable code may be a barcode or a quick response (QR) code in some embodiments. The generated machine-readable code contains encrypted information, for example by encrypting the information received from the user device 210 and then embedding the encrypted information in the machine-readable code. The encrypted information is represented visually in FIG. 2 as a string "@#%^@%&^@%#@^%@%q%&@%^q#@$", which masks the underlying information/data or makes the information/data unreadable by a human.

In some embodiment, an error-detection mechanism is also embedded in the machine-readable code, such as a checksum. Checksums are used to ensure the integrity of a file after it has been transmitted from one device and downloaded by another device. It may be calculated using a hash function and is normally posted along with the downloaded data. To verify the integrity of the downloaded file, a user may calculate the checksum using a checksum calculator program and then compare the posted checksum and the calculated checksum to make sure they match. If they do not match, then the data in the downloaded file may have errors, which could be due to problems that occurred during the transmission process, or possibly malicious tampering from other parties.

Figure 4:
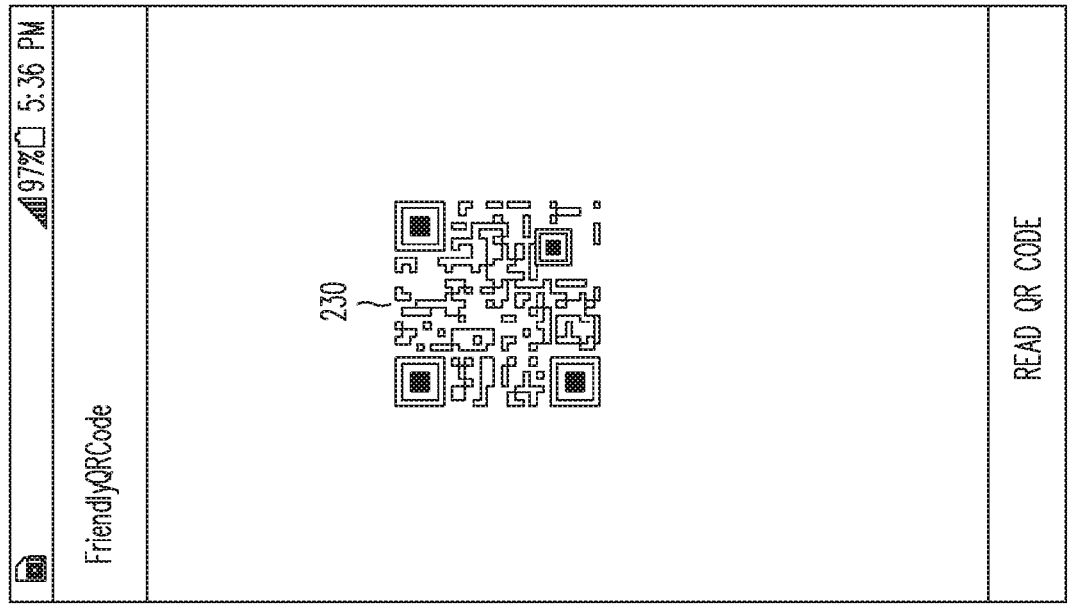

In the embodiment shown in FIG. 2, the machine-readable code generated by the server 220 is sent to the user device 210 in the form of a QR code 230. In step 3 of the process flow 200, the QR code 230 may be displayed, for example by the user interface of the mobile application running on the user device 210, as shown in FIG. 4. The user (Chandler Bing) may not necessarily be aware of how the data is transmitted between the user device 210 and the server 220 in the background throughout this process. From the user's perspective, in response to the virtual button "GENERATE QR CODE" being selected, the QR code 230 shown in FIG. 4 may "automatically" appear on the user device 210. It is also understood that the QR code generation need not necessarily be performed by the server 220.

In some embodiments, rather than being generated by the server 220, the QR code 230 may be locally generated by the mobile application running on the user device 210. The QR code 230 and/or the information embedded therein may then be transmitted by the user device 210 to the server 220, so that the server 220 will have a record of the locally generated QR code 230. For example, the server 220 may store the QR code 230 (and/or its underlying information) in an electronic database, so that it can be retrieved later if needed. In some embodiments, the electronic database may be implemented on an electronic server (e.g., the server 220), which may include an enclave that is subdivided from a rest of the server. The enclave may not be publicly accessible, and internal access to the enclave may also be restricted through the use of internal firewalls or virtual private networks (VPNs). The enclave may also include standalone assets that do not interact with other information systems or networks. The QR code 230 and/or its underlying information may be stored in the enclave, so as to enhance security and privacy of the QR code 230. In embodiments where the QR code 230 may be a multi-use code (e.g., it may be used multiple times), a counter may be associated with the QR code 230 and stored in the electronic database. Each time the QR code 230 is used, the counter may be decremented to keep track of usage of the QR code 230. In some embodiments, the retrieval of the QR code 230 may also be via secure mechanisms such as VPN or via the internal firewalls of the electronic database, so as to further guarantee the integrity of the QR code 230.

Referring back to FIG. 2, in step 4 of the process flow 200, the QR code 230 may be scanned by a user device 250 of another user—Joey Tribbiani—in this case. The user device 250 may also be an embodiment of the user device 110 discussed above and may have an instance of the mobile application running thereon. Using the mobile application, the user Joey Tribbiani may scan the QR code 230, for example by pointing a camera on the user device 250 at the QR code 230. The camera electronically captures the QR code 230, and the mobile application extracts the encrypted information embedded in the QR code 230, where the encrypted information is represented by the string "@#%^@%&^@%#@^%@%q%&@%^q#@$" herein. In embodiments where the checksum (or some other error-detection mechanism) is embedded in the QR code 230, the checksum is also extracted via the scan of the QR code 230. The user device 250 then sends the extracted encrypted information to the server 220 in step 5 of the process flow 200. In some embodiments, the account information of the user Joey Tribbiani is retrieved locally by the mobile application on the user device 250 and sent to the server 220 along with the extracted encrypted information from the scan of the QR code 230. For example, the account information of the user Joey Tribbiani may include a username, password, and/or a user account identifier with the server 220. When the server 220 receives the username, password, and/or the account identifier, it may look up the account of the user Joey Tribbiani.

For each QR code 230, the server 220 may associate with it an encryption/decryption key pair. The encryption key may be used to encrypt the QR code 230 in step 2 of the process flow 200. The encrypted information can only be decrypted using the corresponding decryption key. Thus, using the decryption key associated with the QR code 230, the server 220 processes the QR code 230 and decrypts the encrypted information (that was embedded in the QR code 230), including the account information of the users Chandler Bing and Joey Tribbiani. Again, the decrypted information may include the various parameters of scanning the QR code (e.g., number of times it can be used, the amount of the transaction, expiration date, whether it is a pay-type transaction or a charge-type transaction, etc.), as well as the error-detection mechanism (e.g., the checksum). It is also understood that in some embodiments, the server 220 is the entity that extracts the encrypted information from the QR code 230 and then decrypts it.

If the error-detection mechanism indicates an error in the data transmission, which could be attributed to data corruption or malicious tampering, the transaction will not continue, and the server 220 may send an error message to the device 250 and/or the device 210. In addition, if the scanning of the QR code 230 does not fall within the parameters specified by the user that requested the QR code generation, the server 220 may also send an error message to the device 250 and/or the device 210. For example, if the usage type of the QR code 230 is specified as a one-time use QR code, and the scan performed by the user device 250 was not a first scan of the QR code 230, then the server 220 may send an error message to the device 250 and/or the device 210, and the transaction will not be completed. As another example, if the scan performed by the user device 250 was past the expiration date of the QR code 230, then the server 220 may also send an error message to the device 250 and/or the device 210, and the transaction will not be completed.

Assuming the error-detection mechanism detects no errors, and that the scanning of the QR code 230 falls within the specified parameters, the process flow 200 may continue to step 6, in which the server 220 sends the decrypted information extracted from the scanned QR code 230 to the user device 250. The information may be displayed on the user device 250 via the mobile application, for example in the user interface shown in FIG. 5A or FIG. 5B. In embodiments where the user Chandler Bing has chosen to hide his own identity in the transaction, the server may not send the user identification information of Chandler Bing to the device 250, so that the user Joey Tribbiani will not readily receive the true identity of the user Chandler Bing (with whom he is conducting a transaction) from the server 220. For example, since the server 220 is aware of both parties (Chandler Bing and Joey Tribbiani) involved in the transaction, it may truncate Chandler Bing's user information (represented by WFGHA in the string) from the decrypted information extracted from the scanned QR code 230 and replace it will a random token, such as ABCDEFG. This not only ensures the anonymity of the user Chandler Bing (since the device 250 of the user Joey Tribbiani only receives the random token ABCDEFG from the server 220, instead of Chandler Bing's actual user identification information), but it also enhances the security of the system. For example, even if a hacker somehow obtains the extracted string ABCDEFG-1T-25-S-D20171125@PAYPAL.COM, he will not be able to determine the identity of the user Chandler Bing. Since the machine-readable code 230 is encrypted, and the user Joey Tribbiani does not have the decryption key, he cannot independently decrypt the machine-readable code 230 to extract the user identity information of Chandler Bing either. Even if the user Joey Tribbiani attempts to do so, the attempt may be caught and flagged by the error-detection mechanism, and the server 220 may suspend the transaction as a result. The server 220 may store an electronic association between the randomly-generated token ABCDEFG and the user Chandler Bing, so that the server 220 can keep track of the parties involved in the transaction even if the parties are anonymous to each other and to the public.

Figures 5A, 5B:

Referring to FIGS. 5A-5B, the user interface may display an amount of the transaction, and the user is allowed to add a note describing the transaction. According to the various aspects of the present disclosure, the user (Joey Tribbiani in this case) may also be able to add anonymity to the transaction. For example, the user interface of FIGS. 5A-5B gives the user of the device 250 an option to select whether to participate in the transaction as himself/herself, or as an anonymous user. If the user selects to participate in the transaction as himself/herself, the user's real name may be displayed, such as in FIG. 5A. If the user selects to participate in the transaction as an anonymous user, a suitable anonymous handle may be displayed, such as in FIG. 5B. The mobile application may have a default anonymous user handle, such as "Venmo user" in the embodiment shown in FIG. 5B. The user may also customize the anonymous user handle, for example the user may specify a handle of "Rock star" or any other suitable handle that does not reveal the user's real identity. In either case, the user may click on the virtual button "RECEIVE MONEY" to receive the funds from the paying user, thereby completing the transaction.

Referring back to FIG. 2, the choice of whether or not to use an anonymous user handle may lead to different executions of the process flow 200. For example, if the user of the user device 250 chooses to participate in the transaction as himself/herself, the process flow 200 may perform step 7A, in which an identity of the user may be revealed in the transaction. As a non-limiting example, certain aspects of the transaction involving the user of the user device 250 may be posted via social media, for example as shown in FIG. 6A, where the identity of the user (e.g., Joey Tribbiani) is revealed.

Figures 6A, 6B:
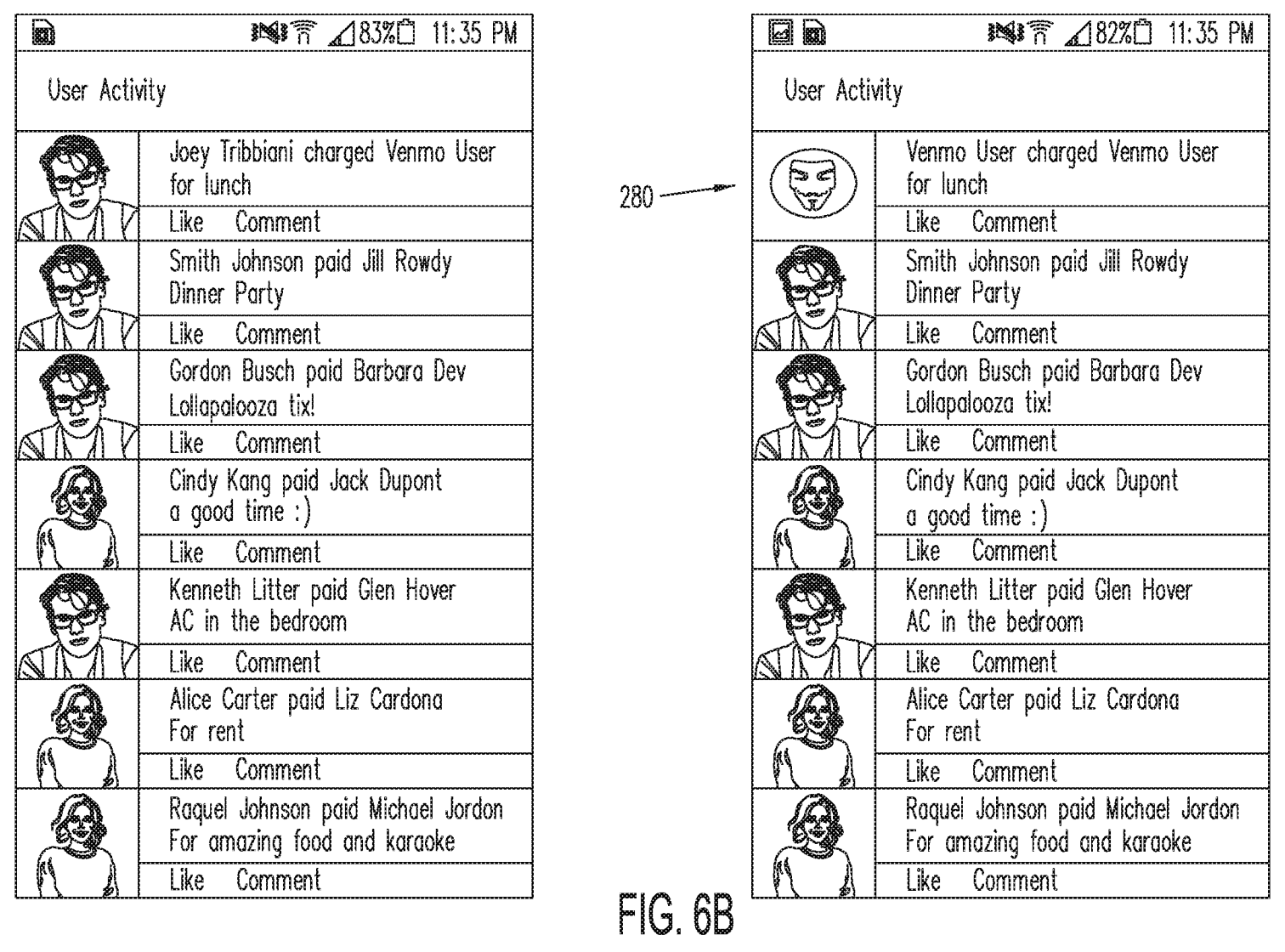

On the other hand, if the user of the user device 250 chooses to participate in the transaction as an anonymous user, the process flow 200 may perform step 7B instead, in which the true identity of the user may be hidden in the transaction, for example as shown in FIG. 6B. Using the social media example, the social media posting may indicate that a "Venmo User" (or another suitable anonymous user handle) participated in a transaction. To further protect the user's anonymity, a profile picture of the user may also by anonymized, for example by replacing the profile picture of the user with another generic anonymous profile picture, such as the picture 280 shown in FIG. 6B, or by hiding or obfuscating an existing profile picture of the user in other embodiments. As such, the social media postings shown in FIG. 6B may include a plurality of transactions conducted between a plurality of different parties. Most of these social media postings include the real identities (e.g., names) of their corresponding users. However, the social media posting pertaining to the transaction between the users Chandler Bing and Joey Tribbiani discussed above may be anonymized, such that it may use an anonymous handle such as "Venmo User" in lieu of the user's real name. It is understood that the anonymizing herein is not limited to profile pictures or the names of the users, but that it may apply to avatars, emojis, stickers, etc.

In some embodiments, the selection of "anonymous" sends a message (not specifically shown in FIG. 2 for reasons of simplicity) from the user device 250 to the server 220 (e.g., in response to the "RECEIVE MONEY" button being clicked) to let the server 220 "know" that the user of the device 250 wishes to remain anonymous. If the social media platform is maintained by the entity associated with the server 220, it will ensure that the user's true identity is not revealed in the social media as a result of the transaction, for example by stripping user identifying information (e.g., name, telephone number, email, address, etc.) from the social media posting involving the user. If the social media is maintained by a third party, the server may send a request to the third party to not reveal the identity of the user. In addition, the server 220 may encrypt the user identity information of Joey Tribbiani in any communication with the user Chandler Bing, such that the real identity of the user Tribbiani may remain hidden to the user Chandler Bing as well.

It is understood that the anonymity aspect of the transaction applies not only to the general public, or to the social media contact lists of the user, but it may also apply to the other party engaged in the transaction. In the example shown in FIG. 2, if the user Joey Tribbiani chooses to remain anonymous, then the user Chandler Bing may not know the true identity of the user Joey Tribbiani either. In other words, the user Chandler Bing may only know the user Joey Tribbiani as "Venmo user" or as some other suitable anonymous handle created by the user Joey Tribbiani. In addition, the user Chandler Bing may not have knowledge of the user Joey Tribbiani's other identifying information such as email, telephone number, account number, etc., even though they just conducted a transaction with each other. Note that in some embodiments, the anonymous handle described herein may be "semi" anonymous, in which some identifying information about the user is provided. This may be advantageous so that a certain group of users may be able identify or recognize the user but not others, while still not providing sufficient information to uniquely identify the user. For example, a user may use the handle "UCLA lawyer" or other handle that includes a more general identifier of a group, interest, location, or any other desired identifier.

It is also understood that the other user Chandler Bing may also protect his privacy by adding anonymity to the transaction, for example via a selection mechanism similar to that shown in FIGS. 5A and 5B. In some embodiments, at the stage where the user Chandler Bing requests the QR code generation, the user interface of the mobile application (e.g., shown in FIG. 3) may display an option to let the user participate in the transaction as himself/herself or as an anonymous user, similar to FIGS. 5A-5B. If Chandler Bing (e.g., the user who requests the QR code generation) also specifies that he wishes to participate in the transaction as an anonymous user, then Joey Tribbiani (e.g., the user who scans the QR code) will not know the true identity of the Chandler Bing either. In any social media posting involving the transaction, the identity of the user Chandler Bing will remain hidden as well, for example it may be displayed as "Venmo user" or another suitable handle chosen by the user.

It is understood that in some embodiments, the server 220 may still have access to the true identities of the users, even if the users may appear anonymous to one another or to the general public such as their social media contacts. In this manner, the server 220 may retrieve a record of the transaction later if needed, for example to resolve a dispute between the parties involved in the transaction.

Figure 7B:
FIG. 7 illustrates another process flow of conducting a transaction in which user anonymity is protected according to various aspects of the present disclosure.

FIGS. 2-4, 5A-5B and 6A-6B illustrate a pay/send process flow of the present disclosure, where a user initiates a transaction to pay/send money to another user via the generation of a machine-readable code. The present disclosure also includes a charge/receive process flow, in which a user initiates a transaction to charge/receive money from another user via the generation of a machine-readable code. For example, FIG. 7 illustrates an embodiment of this charge/receive process flow 300. In step 1 of the process flow 300, a user—Joey Tribbiani—launches a mobile application on his mobile device 210. The mobile device 210 may be an embodiment of the user device 110 discussed above, and the mobile application may be implemented as the mobile application installed on the user device 110 and also discussed above in association with FIGS. 2-6. Via a user interface similar to that is shown in FIG. 3, the user (Joey Tribbiani) may specify the various parameters of the machine-readable code discussed above, such as number of times of usage, the monetary amount, the expiration date, and type of transaction (pay or charge). Whereas the user interface in FIG. 3 illustrates a pay type transaction for the process flow 200, the user may specify a charge type transaction for the process flow 300. As discussed above, the user may request the machine-readable code to be generated by clicking on the virtual button "GENERATE QR CODE".

In response to the clicking of the button "GENERATE QR CODE", the user device 210 sends the parameters associated with the machine-readable code (yet to be generated) to the server 220, along with the account information of the user (e.g., account information of Joey Tribbiani in this case). The information sent to the server 220 may be visually represented in FIG. 2 as a string "CUZDK-1T-25-R-D20171125@PAYPAL.COM," where "CUZDK" represents the account information (e.g., real name of the user, a handle of the user, phone number of the user, email of the user, etc.), "1T" represents that the machine-readable code may be used only 1 time, "25" represents the monetary amount associated with the machine-readable code, "R" represents that the transaction is a "receive/charge" transaction in which the user charges funds from another party (e.g., receiving payment from the other party), "D20171125" represents the expiration date of the machine-readable code, and "PAYPAL.COM" represents the domain name of the server 220. It is understood that this string is merely a visual illustration of the information sent to the server 220 in the context of the graphical process flow 300 shown in FIG. 3, and that the actual information sent to the server 220 may not be in the form of the string.

In embodiments where the user Joey Tribbiani has chosen to hide his own identity in the transaction, the server may not send the user identification information of Joey Tribbiani to the device 250, so that the user Chandler Bing will not readily receive the true identity of the user Joey Tribbiani (with whom he is conducting a transaction) from the server 220. For example, since the server 220 is aware of both parties (Chandler Bing and Joey Tribbiani) involved in the transaction, it may truncate Joey Tribbiani's user information (represented by CUZDK in the string) from the decrypted information extracted from the scanned QR code 230 and replace it will a randomly generated token, such as MNOPQR. This not only ensures the anonymity of the user Joey Tribbiani (since the device 250 of the user Chandler Bing only receives the random token MNOPQR from the server 220, instead of Joey Tribbiani's actual user identification information), but it also enhances the security of the system. For example, even if a hacker somehow obtains the extracted string MNOPQR-1T-25-R-D20171125@PAYPAL.COM, he will not be able to determine the identity of the user Joey Tribbiani. Since the machine-readable code 230 is encrypted, and the user Chandler Bing does not have the decryption key, he cannot independently decrypt the machine-readable code 230 to extract the user identity information of Joey Tribbiani either. Even if the user Chandler Bing attempts to do so, the attempt may be caught and flagged by the error-detection mechanism, and the server 220 may suspend the transaction as a result. The server 220 may store an electronic association between the randomly-generated token MNOPQR and the user Joey Tribbiani, so that the server 220 can keep track of the parties involved in the transaction even if the parties are anonymous to each other and to the public.

In step 2 of the process flow 300, the server 220 generates a machine-readable code based on the information sent by the user device 210. The machine-readable code may be a barcode or a quick response (QR) code in some embodiments. The generated machine-readable code contains encrypted information, which is represented visually in FIG. 2 as a string "@#%^@%&^@%#@^%@%q%&@%^q#@$". Similar to the process flow 200, an error-detection mechanism such as a checksum may also be embedded in the machine-readable code in order to verify transaction integrity.

In the embodiment shown in FIG. 3, the machine-readable code generated by the server 220 is sent to the user device 210 also in the form of a QR code 230. In step 3 of the process flow 300, the QR code 230 may be displayed, for example by the user interface of the mobile application running on the user device 210, via a user interface similar to that shown in FIG. 4. Again, it is understood that the QR code generation need not necessarily be performed by the server 220, but it may also be performed locally on the user device 210 as well.

In step 4 of the process flow 300, the QR code 230 may be scanned by a user device 250 of another user—Chandler Bing—in this case. The user device 250 may also be an embodiment of the user device 110 discussed above and may have an instance of the mobile application running discussed above thereon. Using the mobile application, the user Chandler Bing may scan the QR code 230, which causes the encrypted information embedded in the QR code 230 to be sent to the server 220 in step 5 of the process flow 300, along with the account information of the user Chandler Bing. The server 220 may process the QR code 230 and extracts the information embedded therein, including the account information of the users Chandler Bing and Joey Tribbiani, the various parameters of the QR code (e.g., number of times it can be used, the amount of the transaction, expiration date, whether it is a pay-type transaction or a charge-type transaction, etc.), as well as the error-detection mechanism (e.g., the checksum).

Assuming the error-detection mechanism detects no errors, and that the scanning of the QR code 230 falls within the specified parameters, the process flow 300 may continue to step 6, in which the process flow 300, the server 220 sends the information extracted from the scanned QR code 230 to the user device 250. The information may be displayed on the user device 250 via the mobile application, for example via a user interface shown in FIG. 8A or FIG. 8B. Again, the user (Chandler Bing in this case) may also be able to add anonymity to the transaction. For example, the user may select whether to participate in the transaction as himself/herself, or as an anonymous user. If the user selects to participate in the transaction as himself/herself, the user's real name may be displayed. If the user selects to participate in the transaction as an anonymous user, a suitable anonymous handle may be displayed. The mobile application may have a default anonymous user handle or it may let the user customize its anonymous user handle. In either case, the user may click on the virtual button "SEND MONEY" to send the funds to the charging user, thereby completing the transaction.

Referring back to FIG. 3, the choice of whether or not to use an anonymous user handle may lead to different executions of the process flow 300. For example, if the user of the user device 250 chooses to participate in the transaction as himself/herself, the process flow 300 may perform step 7A, in which an identity of the user may be revealed in the transaction. As a non-limiting example, certain aspects of the transaction involving the user of the user device 250 may be posted via social media, for example as shown in FIG. 9A, where the identity of the user (e.g., Chandler Bing) is revealed.

Figures 9A, 9B:
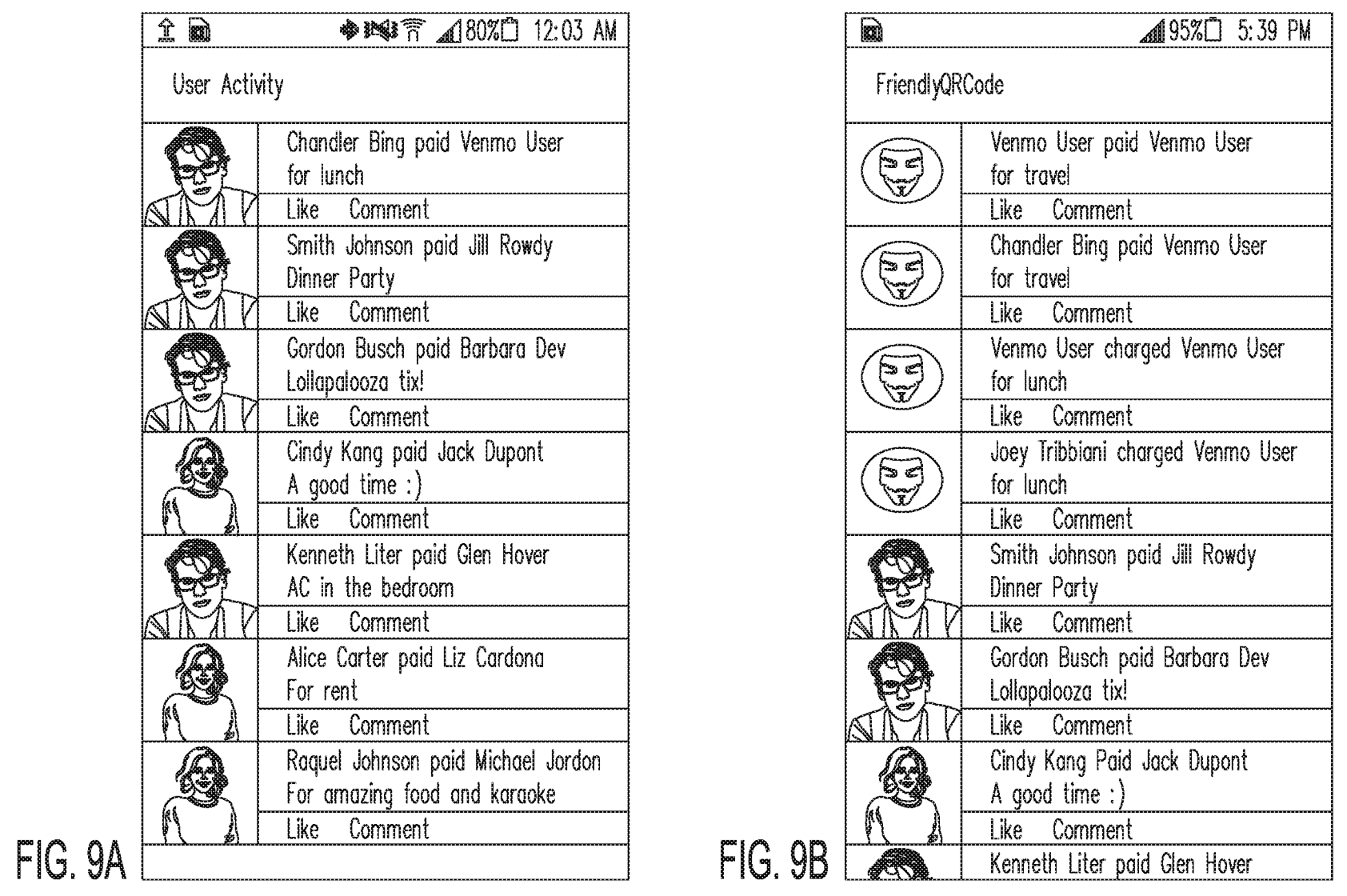

On the other hand, if the user of the user device 250 chooses to participate in the transaction as an anonymous user, the process flow 200 may perform step 7B instead, in which the true identity of the user may be hidden in the transaction, for example as shown in FIG. 9B. Using the social media example, the social media posting may indicate that a "Venmo user" (or another suitable anonymous user handle) participated in a transaction. In some embodiments, the selection of "anonymous" sends a message from the user device 250 to the server 220 (e.g., in response to the "RECEIVE MONEY" button being clicked) to let the server 220 "know" that the user of the device 250 wishes to remain anonymous.

If the social media platform is maintained by the entity associated with the server 220, it will ensure that the user's true identity is not revealed in the social media as a result of the transaction. If the social media is maintained by another party, the server may send a request to the other party to not reveal the identity of the user. As is in the case of the pay type process flow discussed above in association with FIGS. 2-6 above, the anonymity aspect of the transaction applies not only to the general public, or to the social media contact list of the user, but it may also apply to the other party engaged in the transaction. It is also understood that either or both of the users involved in the transaction may protect his privacy by adding anonymity to the transaction, and as such neither the sender nor the receiver may know the identity of the other party.

Although the discussions above use a mobile application as an example tool to facilitate the generation, display, and scanning of the machine-readable code, it is understood that other tools may be used in alternative embodiments. For example, a desktop application or computer program may be used instead of the mobile application.

It is also understood that the present disclosure may apply to situations other than two users sending and/or receiving money from one another. The present disclosure may apply generally to situations where users want to create connections, communicate, or conduct transactions amongst themselves but who may still want to preserve their anonymity. As one example, the present disclosure may apply to users who attend charity events and/or donate money to charitable organizations but do not want to attract the unnecessary attention. As another example, the present disclosure may apply to users who visit thrift stores, flea markets, auctions, or other establishments that the users do not want others to know they are visiting for any number of reasons, such as buying a gift as a surprise, etc. As yet another example, the present disclosure may apply to users who may wish to pay for simple (sometimes one-time) services such as handyman work, lawn-mowing, maid service, etc. As a further example, the present disclosure may apply to users who may wish to use a service or product from a service/product provider, but do not want to end up in a customer list of the service/product provider, to ensure that the users would not receive follow-up advertisements or coupons from the service/product provider, which may become annoying or expose the user's contact information to an unwanted segment of other users. Merchants can also take advantage of the present disclosure by limiting potential transactions to certain time periods (e.g., weekends only) or above or below certain amounts (minimal entry fee or maximum donation fee), or by implementing it for exclusive events such as dance parties, blind dates, winery tours, pottery lessons, fund-raisers, etc. The present disclosure can also be used for pay for things such as airport parking, where anonymity can be easily maintained. Furthermore, the machine-readable codes of the present disclosure are not limited to being displayed only on the screens of electronic devices. In alternative embodiments, the machine-readable codes such as the QR code 230 may be displayed on a printed medium such as paper, a poster, a banner, a billboard sign by the road, etc. Any user who comes across these machine-readable codes may be able to scan them and engage in the activity associated with the machine-readable code accordingly.

It is also understood that the present disclosure pertains to other forms of electronic or online activities, not just monetary transactions. For example, the machine-readable code generation and subsequent scanning could be utilized by one or more users to sign electronic documents. A first user may send the machine-readable code, along with a document that needs to be signed, to a second user. The second user may scan the machine-readable code as a proxy of his/her electronic signature. This lets the first user know that the document has been executed by the second user, even if the second user's identity may remain concealed to members of the general public, or even to the first user. The first user may also specify that his/her identity shall remain anonymous during this transaction, and thus the second user need not know the true identity of the first user either, in this above example. In this manner, the first user and the second user may engage in an activity or conduct transaction together without necessarily knowing the real identities of the other party.

As another example, the present disclosure may be utilized to accomplish anonymous voting. A machine-readable code may be generated and sent to a plurality of voting members. Each of the voting members may cast an electronic vote by scanning the machine-readable code that was sent to him/her, while concealing the identity of the voting member(s). In other words, the voting results may indicate the number of members that voted for each voting option, but how each specific member voted for what option remains hidden not only to the public, but also to the voting members themselves, as well as to the organizer of the vote. This is also different from an anonymous online poll, where everyone is allowed to cast an anonymous vote. For example, the voting according to the present disclosure may restrict the voting powers to a predetermined group. The organizer of the vote may have the contact information (e.g., email) of the members of that predetermined group, to ensure that each member of the group (and no outside persons) gets a copy of the machine-readable code. In this manner, the voting is done in a closed environment, and yet anonymity of the voting members is still preserved.

Figure 10:
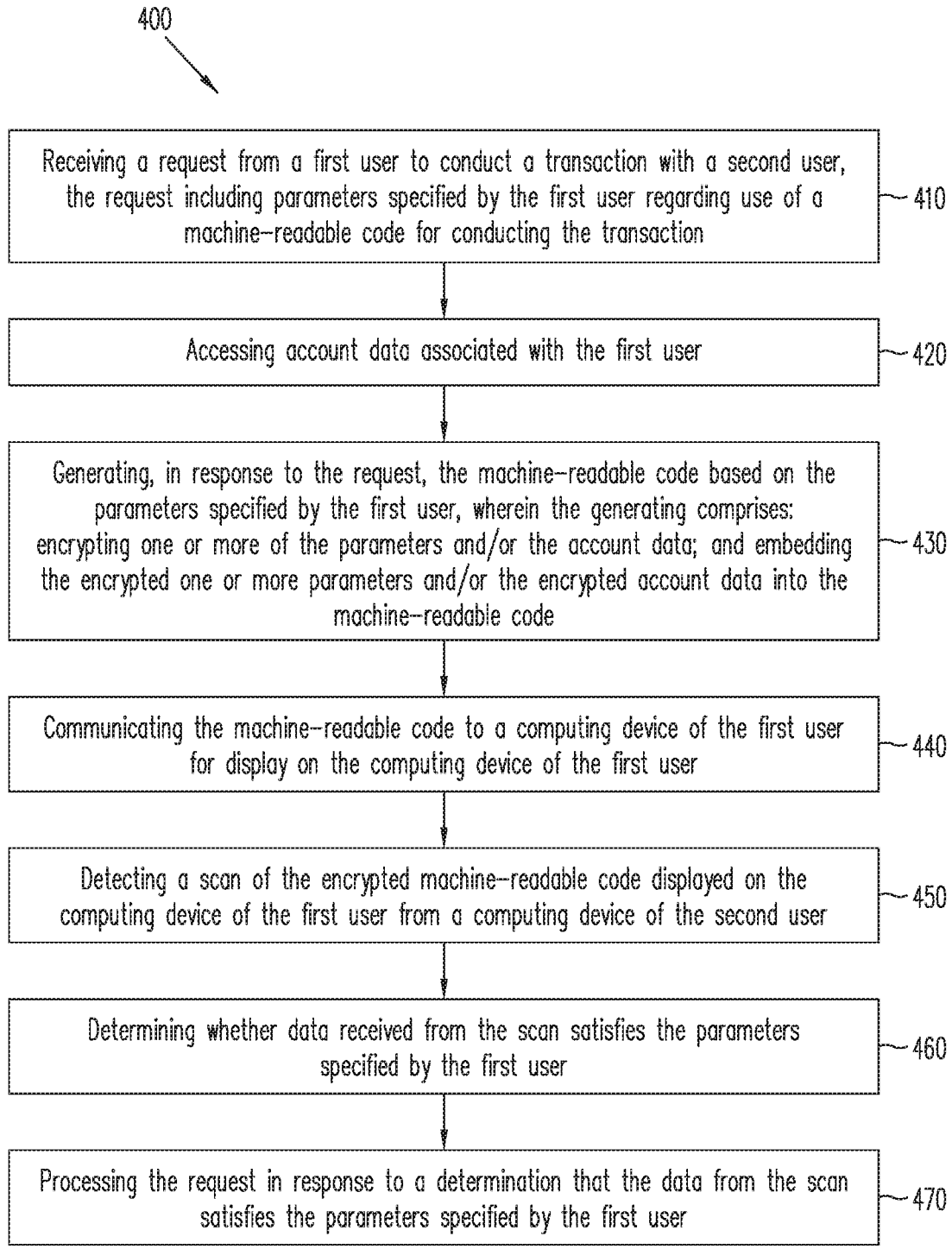
FIG. 10 is a flowchart illustrating a method of protecting user anonymity according to various aspects of the present disclosure.

FIG. 10 is a flowchart illustrating a method 400 for adding user anonymity to electronic transactions or activities. The method 400 includes a step 410 of receiving a request from a first user to conduct a transaction with a second user, the request including parameters specified by the first user regarding use of a machine-readable code for conducting the transaction. In some embodiments, the transaction comprises a transaction in which the first user sends funds to the second user or a transaction in which the first user receives funds from the second user. In some embodiments, the one or more parameters comprises a number of times the machine-readable code can be validly scanned, a time period in which the machine-readable code can be validly scanned, or monetary restriction associated with the machine-readable code.

The method 400 includes a step 420 of accessing account data associated with the first user.

The method 400 includes a step 430 of generating, in response to the request, the machine-readable code based on the parameters specified by the first user, wherein the generating comprises: encrypting one or more of the parameters and/or the account data; and embedding the encrypted one or more parameters and/or the encrypted account data into the machine-readable code. In some embodiments, the machine-readable code comprises a quick response (QR) code.

The method 400 includes a step 440 of communicating the machine-readable code to a computing device of the first user for display on the computing device of the first user.

The method 400 includes a step 450 of detecting a scan of the encrypted machine-readable code displayed on the computing device of the first user from a computing device of the second user.

The method 400 includes a step 460 of determining whether data received from the scan satisfies the parameters specified by the first user.

The method 400 includes a step 470 of processing the request in response to a determination that the data from the scan satisfies the parameters specified by the first user. In some embodiments, wherein the processing the transaction comprises suspending the transaction in response to the scan of the machine-readable code not meeting at least one of the one or more parameters. The method 400 is performed in a manner such that an identity of the first user or an identity of the second user is anonymized. For example, the identity of the first user may not be revealed to the second user, and/or vice versa. As another example, the identity of the first user and/or the second user may not be revealed to members of a social media contact list of the first user or a social media contact list of the second user.

It is understood that additional method steps may be performed before, during, or after the steps 410-470 discussed above. For example, the method 400 may further include a step of extracting information from the machine-readable code at least in part via decryption. In some embodiments, an error-detection mechanism such as a checksum is embedded in the machine-readable code. The machine-readable code may be extracted in response to the scan, and the transaction may be suspended in response to the error-detection mechanism indicating a corruption or tampering of data in the machine-readable code. For reasons of simplicity, these additional steps are not discussed in detail herein.

Figure 11:
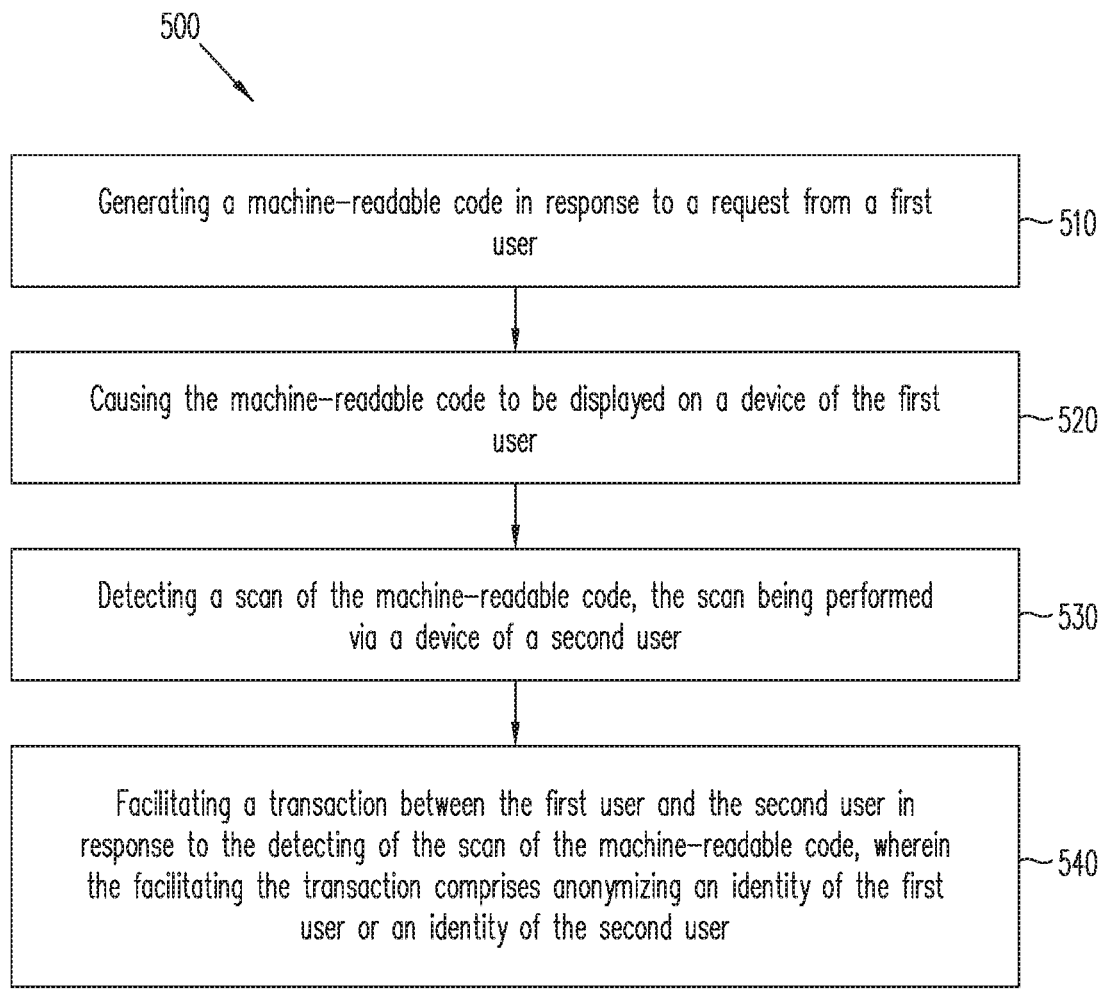
FIG. 11 is a flowchart illustrating a method of protecting user anonymity according to various aspects of the present disclosure.

FIG. 11 is a flowchart illustrating a method 500 for adding user anonymity to electronic transactions or activities. The method 500 includes a step 510 of generating a machine-readable code in response to a request from a first user, where the request can be for any of the actions discussed herein and generally referred to as conducting a transaction with a second user. In some embodiments, the machine-readable code comprises a quick response (QR) code. In some embodiments, the machine-readable code is generated to only have a one-time-use. In some embodiments, the machine-readable code is generated to be only valid within a specified time period. In some embodiments, the machine-readable code is generated to be associated with a monetary restriction.

The method 500 includes a step 520 of causing the machine-readable code to be displayed on a device of the first user.

The method 500 includes a step 530 of detecting a scan of the machine-readable code, the scan being performed via a device of a second user.

The method 500 includes a step 540 of facilitating a transaction between the first user and the second user in response to the detecting of the scan of the machine-readable code. The step 540 comprises anonymizing an identity of the first user or an identity of the second user. In some embodiments, the transaction comprises a transaction in which the first user sends funds to the second user or a transaction in which the first user receives funds from the second user. In some embodiments, the anonymizing comprises concealing the identity of the first user or the identity of the second user from a social media contact list of the first user or from a social media contact list of the second user. In some embodiments, the anonymizing comprises concealing the identity of the first user from the second user or concealing the identity of the second user from the first user.

In some embodiments, the machine-readable code is generated by encrypting transaction information received from the first user and embedding the encrypted transaction information in the machine-readable code. The transaction information may include one or more parameters of the machine-readable code that specify a validity of the scan of the machine-readable code. In some embodiments, the method 500 may further include a step of decrypting the encrypted transaction information in response to the detecting of the scan of the machine-readable code in step 530. In some embodiments, the step 540 of facilitating the transaction comprises suspending the transaction in response to the scan of the machine-readable code not meeting at least one of the one or more parameters. In some embodiments, the step 510 of generating the machine-readable code further comprises embedding an error-detection mechanism (such as a checksum) in the machine-readable code, and the decrypting of the encrypted transaction information further comprises extracting the error-detection mechanism from the machine-readable code. In some embodiments, the step 540 of facilitating the transaction further comprises suspending the transaction in response to the error-detection mechanism indicating a corruption or tampering of data in the decrypted transaction information.

It is understood that additional method steps may be performed before, during, or after the steps 510-540 discussed above. For reasons of simplicity, these additional steps are not discussed in detail herein.

Figure 12:
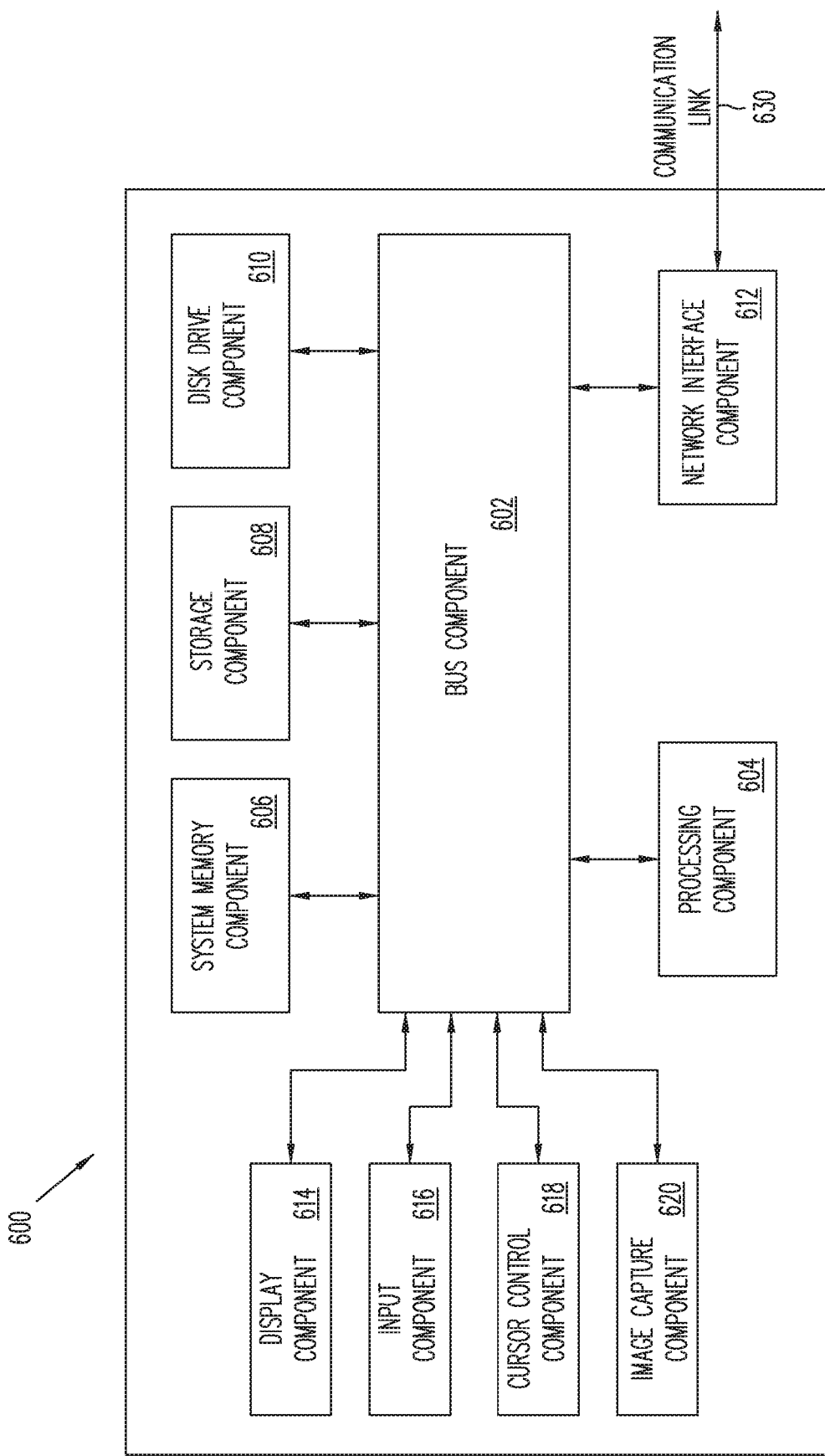
FIG. 12 is an example computer system for implementing the process flows of protecting user anonymity according to various aspects of the present disclosure.

FIG. 12 is a block diagram of a computer system 600 suitable for implementing various methods and devices described herein, for example, the process flows 200 and 300 and the various method steps of the method 500. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the process flows 200 and 300 and the method 500 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 13:
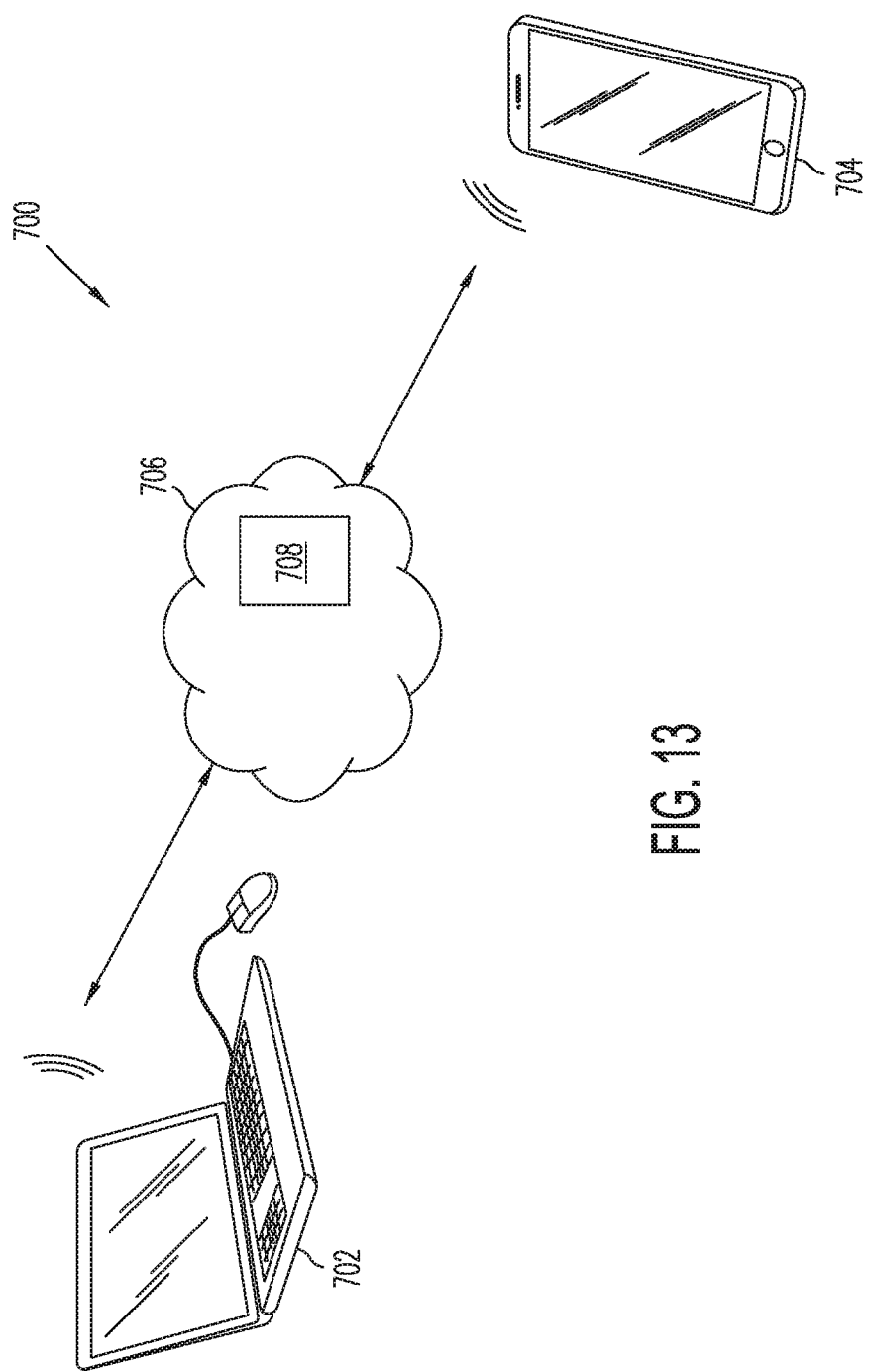
FIG. 13 is a simplified example of a cloud-based computing architecture according to various aspects of the present disclosure.

FIG. 13 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is that by anonymizing a user's identity, the user will enjoy enhanced privacy and may be more willing to conduct the transactions engage in electronic activities where privacy is a concern. Another advantage is that the anonymizing discussed above may be performed bi-directionally, that is, either party of the transaction can add anonymity to himself/herself, and the other party will not be able to disclose the identity of the party seeking anonymity. Yet another advantage is that by restricting transactions to certain amounts or certain time periods, illicit activities such as money laundering or tax fraud may be reduced. The various aspects of the present disclosure are also compatible with existing process flow and do not require extensive hardware or software modifications, and thus the present disclosure is cheap to implement.

One aspect of the present disclosure involves a method. The method includes: generating a machine-readable code in response to a request from a first user; detecting a scan of the machine-readable code, the scan being performed via a device of a second user; and facilitating a transaction between the first user and the second user in response to the detecting of the scan of the machine-readable code, wherein the facilitating the transaction comprises anonymizing an identity of the first user or an identity of the second user.

Another aspect of the present disclosure involves a system that includes a non-transitory memory and one or more hardware processors coupled to the non-transitory memory and configured to read instructions from the non-transitory memory to cause the system to perform operations comprising: generating a machine-readable code in response to a request from a first user, the request specifying one or more conditions under which an electronic scan of the machine-readable code is valid; causing the machine-readable code to be displayed on a device of the first user; detecting that the machine-readable code displayed on the device of the first user has been electronically scanned by a device of a second user; determining whether a scan of the machine-readable code by the device of the second user satisfies the one or more conditions; and facilitating a transaction between the first user and the second user in response to a determination that the scan of the machine-readable code satisfies the one or more conditions, wherein the facilitating the transaction comprises concealing an identity of the first user or an identity of the second user.

Yet another aspect of the present disclosure involves a non-transitory machine-readable medium having stored thereon machine-readable instructions executable to cause a machine to perform operations comprising: generating a machine-readable code in response to a request from a first user, the request specifying a number of times or a time period during which the machine-readable code can be validly scanned electronically; causing the machine-readable code to be displayed on a device of the first user; detecting that the machine-readable code displayed on the device of the first user has been electronically scanned by a device of a second user; determining that a scan of the machine-readable code by the device of the second user occurred within the specified number of times or within the specified time period; and facilitating a transaction between the first user and the second user in response to the determination, wherein the facilitating the transaction comprises hiding an identity of the first user or an identity of the second user from each other and from social media contacts of the first user and the second user.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving a request from a first user to conduct a transaction with a second user, the request including one or more parameters specified by the first user regarding a use of a machine-readable code for conducting the transaction;
accessing account data associated with the first user;
generating, in response to the request, an encrypted machine-readable code based on the one or more parameters specified by the first user, wherein the generating comprises:
encrypting the one or more parameters and the account data; and
embedding the encrypted one or more parameters and the encrypted account data into the machine-readable code;
communicating the encrypted machine-readable code to a computing device of the first user for display via a graphical user interface on the computing device of the first user;
causing the graphical user interface to present an option to conduct anonymous transactions;
receiving, from the computing device of the first user, a selection of the option;
receiving, from a computing device of the second user, information indicating that the encrypted machine-readable code displayed on the computing device of the first user has been scanned by the computing device of the second user;
determining whether data received from the scanned encrypted machine-readable code satisfies the one or more parameters specified by the first user; and
processing the request in response to a determination that the data from the scanned encrypted machine-readable code satisfies the one or more parameters specified by the first user, wherein the processing the request comprises selectively anonymizing, in response to the selection of the option, an identity of the first user at least in part by:
selectively removing user identification information of the first user before information regarding the transaction is communicated to the second user; and
selectively concealing the identity of the first user from a social media contact list of the first user or from a social media contact list of the second user at least in part by replacing the identity of the first user with a generic identity that is shared by multiple users including the first user.

2. The system of claim 1, wherein the machine-readable code comprises a quick response (QR) code.

3. The system of claim 1, wherein the transaction comprises a transaction in which the first user sends funds to the second user or a transaction in which the first user receives funds from the second user.

4. The system of claim 1, wherein the processing the request comprises suspending the transaction in response to the scanned encrypted machine-readable code not meeting at least one of the one or more parameters.

5. The system of claim 1, wherein the one or more parameters comprises a number of times the machine-readable code can be validly scanned.

6. The system of claim 1, wherein the one or more parameters comprises a time period in which the machine-readable code can be validly scanned.

7. The system of claim 1, wherein the generating the one or more parameters comprises a monetary restriction associated with the machine-readable code.

8. The system of claim 1, wherein the operations further comprise extracting information from the machine-readable code at least in part via decryption.

9. The system of claim 8, wherein:
the generating the machine-readable code further comprises embedding an error-detection mechanism in the machine-readable code;
the extracting further comprises extracting the error-detection mechanism from the machine-readable code; and
the processing the request further comprises suspending the transaction in response to the error-detection mechanism indicating a corruption or tampering of data in the extracted information.

10. The system of claim 9, wherein the embedding the error-detection mechanism comprises embedding a checksum in the machine-readable code.

11. The system of claim 1, wherein the selectively anonymizing further comprises selectively replacing a profile picture of the first user or a profile picture of the second user with an anonymous picture.

12. The system of claim 1, wherein the operations further comprise: posting, in a social media platform containing transactional information between a plurality of users, information pertaining to the transaction between the first user and the second user while concealing the identity of the first user, wherein identities of at least some users of the plurality of users are revealed in the social media platform.

13. A method, comprising:
generating a machine-readable code in response to a request from a first user, the request specifying one or more conditions under which an electronic scan of the machine-readable code is valid, wherein the generating comprises embedding encrypted account information of the first user in the machine-readable code;
causing the machine-readable code to be displayed on a graphical user interface of a device of the first user;
causing the graphical user interface to present an option to conduct transactions while concealing the identity of the first user;
receiving, from the device of the first user, a selection of the option;
receiving information indicating that the machine-readable code displayed on the device of the first user has been electronically scanned by a device of a second user;
determining whether a scan of the machine-readable code by the device of the second user satisfies the one or more conditions; and processing a transaction between the first user and the second user in response to a determination that the scan of the machine-readable code satisfies the one or more conditions, wherein the processing the request comprises selectively concealing, in response to the selection of the option, an identity of the first user at least in part by:
   selectively removing user identification information of the first user in a communication sent to the second user; and
   selectively concealing the identity of the first user from a social media contact list of the first user or from a social media contact list of the second user at least in part by replacing the identity of the first user with a generic identity that is shared by multiple users.

14. The method of claim 13, wherein:
the machine-readable code comprises a quick response (QR) code; and
the transaction comprises a transaction in which the first user sends funds to the second user or a transaction in which the first user receives funds from the second user.

15. The method of claim 13, wherein the generating of the machine-readable code further comprises: encrypting the one or more conditions and an error-detection mechanism and embedding the encrypted one or more conditions and the error-detection mechanism in the machine-readable code.

16. The method of claim 13, wherein the one or more conditions comprise:
   a number of times the machine-readable code can be validly scanned; or
   a time period within which the machine-readable code can be validly scanned.

17. The method of claim 13, wherein the selectively concealing further comprises selectively replacing a profile picture of the first user with a generic profile picture.

18. The method of claim 13, further comprising: posting, in a social media platform containing transactional information between a plurality of users, information pertaining to the transaction between the first user and the second user while concealing the identity of the first user, wherein identities of at least some users of the plurality of users are revealed in the social media platform.

19. A non-transitory machine-readable medium having stored thereon machine-readable instructions executable to cause a machine to perform operations comprising:
   accessing an account information of a first user in response to a request received from a first user to conduct a transaction with a second user, the request specifying a number of times or a time period during which a machine-readable code can be validly scanned electronically;
   encrypting the account information of the first user;
   generating the machine-readable code by embedding the encrypted account information in the machine-readable code;
   causing the machine-readable code to be displayed via a graphical user interface on a device of the first user;
   causing the graphical user interface to present an option that allows the identity of the first user to be hidden in transactions involving the first user;
   determining that the option has been selected via the graphical user interface;
   receiving information indicating that the machine-readable code displayed on the device of the first user has been electronically scanned by a device of the second user;
   determining that a scan of the machine-readable code by the device of the second user occurred within the specified number of times or within the specified time period; and
   facilitating a transaction between the first user and the second user in response to the determination while selectively hiding an identity of the first user from the second user and from social media contacts of the first user, wherein the selectively hiding is performed in response to the determination that the option has been selected, and wherein the selectively hiding comprises selectively stripping user identification information of the first user before information regarding the transaction is communicated to the social media contacts and replacing the stripped user identification information with generic identification information that does not specifically identify any particular user.

20. The non-transitory machine-readable medium of claim 19, wherein:
   the generating the machine-readable code further comprises embedding an error-detection mechanism in the machine-readable code;
   the determining that the scan of the machine-readable code occurred further comprises determined that the error-detection mechanism has been extracted from the machine-readable code via the scan; and
   the facilitating the transaction further comprises suspending the transaction in response to the extracted error-detection mechanism indicating a corruption or tampering of data.

* * * * *